United States Patent
Zhang et al.

(10) Patent No.: US 12,223,056 B1
(45) Date of Patent: Feb. 11, 2025

(54) GRAPH-BASED DETECTION OF ABUSIVE COMPUTATIONAL NODES

(71) Applicant: Amazon Technologies, Inc., Seattle, WA (US)

(72) Inventors: Zhilin Zhang, Burnaby (CA); Naveed Ahmed Saleem Janvekar, Redmond, WA (US); Pengbin Feng, Seattle, WA (US); Nitika Bhaskar, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 360 days.

(21) Appl. No.: 17/840,176

(22) Filed: Jun. 14, 2022

(51) Int. Cl.
*H04L 9/40* (2022.01)
*G06F 21/57* (2013.01)
*G06N 3/042* (2023.01)

(52) U.S. Cl.
CPC .......... *G06F 21/577* (2013.01); *G06N 3/042* (2023.01); *H04L 63/1416* (2013.01); *G06F 2221/034* (2013.01); *H04L 63/1425* (2013.01)

(58) Field of Classification Search
CPC ............ G06F 21/577; G06F 2221/034; H04L 63/1433; H04L 63/1466; H04L 63/1483; H04L 2463/144
See application file for complete search history.

(56) References Cited

U.S. PATENT DOCUMENTS

| | | | |
|---|---|---|---|
| 9,148,441 B1 * | 9/2015 | Tamersoy | G06F 21/566 |
| 10,305,921 B2 * | 5/2019 | Gao | H04L 63/1425 |
| 10,567,402 B1 * | 2/2020 | Comeaux | G06N 5/01 |
| 2015/0213370 A1 * | 7/2015 | Chakrabarti | G06Q 50/01 706/52 |
| 2016/0197951 A1 * | 7/2016 | Lietz | H04L 63/0227 726/23 |
| 2017/0063908 A1 * | 3/2017 | Muddu | G06F 16/285 |
| 2017/0359376 A1 * | 12/2017 | Evron | H04L 63/1425 |

(Continued)

OTHER PUBLICATIONS

Needham et al., "Graph Algorithms in Neo4j: Label Propagation" [Online], Mar. 4, 2019 [Retrieved on: Jul. 25, 2024], www.neo4j.com, Retrieved from: < https://neo4j.com/blog/graph-algorithms-neo4j-label-propagation/ > (Year: 2019).*

(Continued)

*Primary Examiner* — Eric W Shepperd
(74) *Attorney, Agent, or Firm* — K&L Gates LLP

(57) ABSTRACT

Devices and techniques are generally described for detection of abusive computational nodes. In various examples, first input data describing a first plurality of computational nodes and first data identifying a dimension along which to parse the first plurality of computational nodes may be received. A first computing device may generate input graph data representing the first plurality of computational nodes. The computational nodes of the first plurality of computational nodes may share a same value for the dimension are connected to one another in the input graph data. In various examples, a first graph machine learning model and at least one known abusive computational node may be used to determine a first set of candidate computational nodes for further evaluation. In some cases, network access of a first computational node of the first set of candidate computational nodes may be terminated.

18 Claims, 10 Drawing Sheets

(56) References Cited

U.S. PATENT DOCUMENTS

| | | | | |
|---|---|---|---|---|
| 2018/0039779 | A1* | 2/2018 | Li | G06F 21/56 |
| 2019/0132224 | A1* | 5/2019 | Verma | G06F 18/24 |
| 2020/0042700 | A1* | 2/2020 | Li | G06F 21/554 |
| 2020/0358815 | A1* | 11/2020 | Dalek | H04L 69/22 |
| 2020/0364338 | A1* | 11/2020 | Ducau | G06F 21/564 |
| 2020/0394707 | A1* | 12/2020 | Guo | G06Q 40/00 |
| 2021/0319324 | A1* | 10/2021 | Mueller | G06N 3/04 |
| 2021/0352095 | A1* | 11/2021 | Cam | G06N 7/01 |
| 2022/0046086 | A1* | 2/2022 | Badawy | G06F 21/57 |
| 2022/0116782 | A1* | 4/2022 | Sabah | H04W 12/30 |
| 2022/0172211 | A1* | 6/2022 | Muthuswamy | G06F 16/9024 |
| 2022/0277315 | A1* | 9/2022 | Mittal | G06Q 30/0201 |
| 2022/0345484 | A1* | 10/2022 | Drozd | H04W 12/67 |
| 2022/0360587 | A1* | 11/2022 | Badawy | H04L 63/105 |
| 2022/0374524 | A1* | 11/2022 | Pandey | G06F 21/577 |
| 2023/0004645 | A1* | 1/2023 | Kurogome | G06F 18/213 |

OTHER PUBLICATIONS

Zadeh et al.,"Dimension Independent Matrix Square using MapReduce (DIMSUM)" [Online], Oct. 22, 2014 [Retrieved on: Aug. 5, 2024], Standford University, Retrieved from: < https://arxiv.org/pdf/1304.1467 > (Year: 2014).*

* cited by examiner

GRAPH-BASED DETECTION OF ABUSIVE COMPUTATIONAL NODES

BACKGROUND

Online cyber attack attempts such as denial-of-service (DoS) attacks, unauthorized data exfiltration, cyber fraud, and other attacks continue to grow year-over-year, putting pressure on online entities and network administrators to innovate in order to protect customers, revenue, and prevent service disruption. The field of online fraud detection and cyberattack prevention can be categorized as an adversarial environment, where those with intentions to commit fraud and/or malicious cyber attacks are pitted against those endeavoring to prevent and deter such activity. This "arms race," as it is often referred to, involves continuous adaptation, as tactics of the opponents evolve over time.

DETAILED DESCRIPTION

Figure 1:
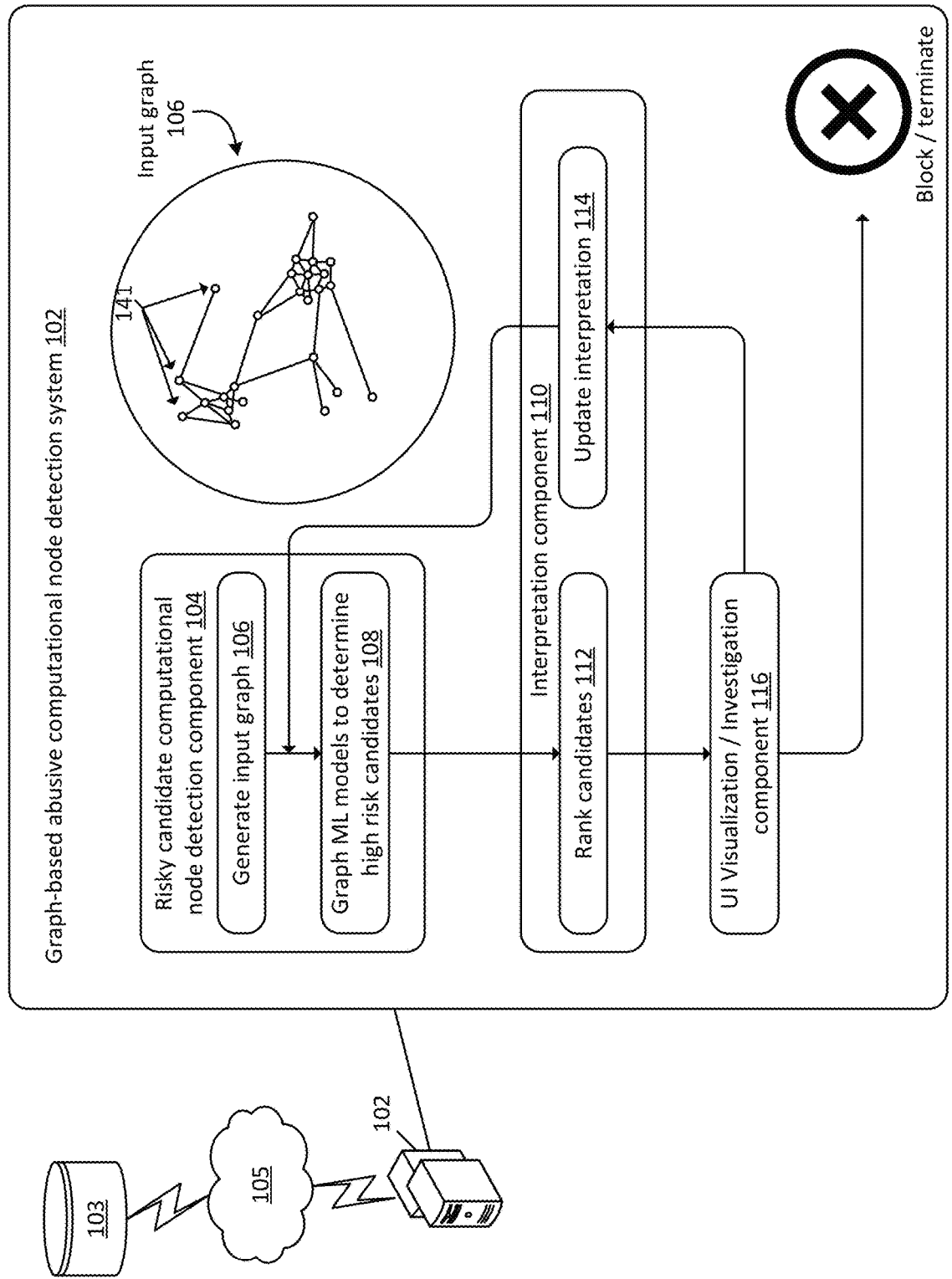
FIG. 1 is a block diagram illustrating a graph-based abusive computational node detection system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Perpetrators of transactional fraud and other cyber-attacks continually attempt to modify their behavior and/or the characteristics of their attacks and/or fraudulent transactions in order to avoid detection by automated filters and/or machine learning models used to distinguish between potentially fraudulent transactions and non-fraudulent transactions. As a result, technologies are continuously developed by fraud prevention and cyber-security teams to attempt to detect and prevent such attacks in an ever-evolving climate. Accordingly, the actions of perpetrators of fraud and other cyber attacks and cyber security teams are adversarial in nature, as a change in attack detection techniques results in evolving attack methodologies, and vice versa.

In various examples, attackers modify network identifiers in order to mask the identity of the attacker and/or to make the attacks appear as though they are legitimate service requests. For example, attackers may modify phone numbers, internet protocol (IP) addresses, geo-location data, and/or other hierarchical data representations associated with attacks and/or fraudulent transactions in order to cyber attack prevention measures. In other examples, attackers may modify data associated with their account in order to avoid detection by automated detection systems and/or filters.

However, even such automated detection systems suffer shortcomings. For example, a typical automated network anomaly detection system may be a Boolean detection system indicating that action X has been performed Y (or more) times within Z timeframe. However, such linear detection systems require careful planning and/or empirical testing to determine the appropriate actions to measure and the appropriate thresholds for such actions. If thresholds are set too low (e.g., for a read action on sensitive data, for example) high false positives (low precision) can result, where legitimate actions are flagged and/or prevented, ultimately wasting resources to investigate such false positives. Conversely, if thresholds are set too high, anomalous actions and/or network attacks may slip through undetected (low recall). Abusive computational nodes may modify their behavior and/or their data to avoid detection by such automated detections systems.

Some common strategies for dealing with automated abuse detection include selection of a set of potentially abusive computational nodes for human investigation based on automated detection system results. After the investigations have occurred, known abusive computational nodes (e.g., computational nodes confirmed as abusive) are selected for enforcement actions (e.g., account suspension, termination of service and/or network access, etc.). However, while such techniques may be useful, they limit the coverage of computational node abuse detection for several reasons. First, there is a limited capacity for human investigation (e.g., time constraints) which means that all potentially-abusive computational nodes cannot be investigated in a meaningful time span. As such, conducted investigations generate a small number of confirmed abusive computational nodes (e.g., label data) and a large set of uninvestigated, potentially abusive computational nodes. Second, existing automated detection systems (e.g., machine learning classifiers and/or heuristic filters) typically operate at the individual entity level (e.g., determining whether a single computational node is risky or not based on the attributes of that computational node). However, described herein are graph-based techniques that consider risk evaluation of computational nodes at multiple levels of computational nodes and/or their actions, such as account holder ID, data generated by the account (e.g., web page data and/or form data), create, read, update, delete actions, unauthorized or unusual data access, exfiltration, unusual port usage, unauthorized and/or unusual scripting, etc. Human investigators are not only unable to determine such relationships at scale due to the large volume of information to be considered, but are also unable to determine relative levels of risk based on distant and/or multi-tiered relationships. Accordingly, the graph-based abusive computational node detection systems and techniques described herein are able to model high dimensional data to determine relationships between known good computational nodes and/or known abusive computational nodes and potentially risky nodes (e.g., computational nodes under evaluation). Upon determining that a particular computational node is abusive (with a high degree of confidence) an automated, programmatic action may be taken (e.g., terminating access of the computational node). Detection of abusive computational nodes can prevent network-based attacks on compute systems, networks, and services to prevent service disruption, data theft, and/or other malicious activity.

As used herein, computational nodes refers to entities having access to a compute service, a network accounts, data generated by such entities (e.g., data generated for hosting on an account generated for the computational node by a monitored service), actions taken by such entities (e.g., Create, Read, Update, and Delete (CRUD) operations), and/or attributes of such entities (e.g., account name, account actions, IP address, various identifier data, etc.).

FIG. 1 is a block diagram illustrating example components of a graph-based abusive computational node detection system 102, according to various embodiments of the present disclosure. In various examples, one or more computing devices may implement the graph-based abusive computational node detection system 102. In examples where more than one computing device implements the graph-based abusive computational node detection system 102, the different computing devices may communicate with one another over a network 105. In various examples, each of the one or more computing devices used to implement graph-based abusive computational node detection system 102 may comprise one or more processors. The one or more computing devices used to implement graph-based abusive computational node detection system 102 may be configured in communication with at least one non-transitory computer readable memory 103 ("memory 103"). In at least some examples, the one or more computing devices used to implement graph-based abusive computational node detection system 102 may communicate with memory 103 over network 105. The memory 103 may store computer-readable instructions that, when executed by at least one processor of the one or more computing devices implementing graph-based abusive computational node detection system 102, may be effective to program the one or more processors to perform the various techniques described herein.

In various examples, network 105 is a wide area network, such as the Internet, while in other embodiments, the network 105 is a local area network (LAN) over which requests may be received. In some further embodiments network 105 is a combination of the Internet and a LAN.

Risky Candidate Computational Node Detection Component

In various examples, the graph-based abusive computational node detection system 102 may implement a risky candidate computational node detection component 104. The risky candidate computational node detection component 104 may include an interface effective to receive input data (e.g., a comma-separated values (CSV) file) describing various computational nodes and their attributes. The attributes may have a plurality of dimensions. For example, attributes for a given computational node may include IP addresses and/or physical addresses associated with the computational node, account identifier data, uniform resource locators (URLs) associated with the computational node, data identifying data generated by the computational node using various compute services, type information describing a type of the computational node (e.g., a website, a particular account, a group of accounts, etc.). The risky candidate computational node detection component 104 may include logic effective to generate an input graph 106 of the computational nodes 141 connected by edges (e.g., connections between the computational nodes 141) using the input data (e.g., a CSV file and/or other structured data representing the computational nodes and their respective attributes). As discussed above, computational nodes may represent multiple types of entities which may vary according to the enterprise implementing the graph-based abusive computational node detection system 102. The edges indicate the shared and/or similar attribute among nodes. Computational nodes that have shared and/or sufficiently similar attribute values (as determined using a similarity matching algorithm) may be described as corresponding to one another (in the input graph 106). Similarly, values that are shared and/or similar for computational nodes along a selected dimension may be described as corresponding values for the selected dimension(s). In general, the input data may be parsed along any desired dimension and/or set of dimensions to generate the input graph 106. For example, in a particular implementation, an edge connecting two computational nodes in the input graph 106 may indicate that the two computational nodes share both a common IP address (and/or have a similar IP address) and/or account identifier data. Fuzzy matching may be used to determine similar values. Various approximate string matching/fuzzy matching techniques may be used (e.g., to determine a similarity between a computational node account name "JohnDoe123" and the computational node account name "JohnDo123"). Algorithms such as Levenshtein distance, Fuzzywuzzy, Soundex, Metaphone (for phonetic similarity), etc., may be used to determine similarity between attributes when constructing the input graph 106. The input graph 106 may include some seed nodes that have known labels. These labeled computational nodes are a list of confirmed abusive entities (e.g., known malicious computational nodes) and/or confirmed non-abusive entities. Labeled computational nodes may be so labeled based on historic data (e.g., data indicating that a particular computational node is associated with unauthorized scripting, uploading of malicious code, etc.).

The risky candidate computational node detection component 104 may be effective to perform label propagation to propagate risk scores from the labeled computational nodes to non-labeled computational nodes based on their relationships and/or proximity in the input graph 106. For example, using graph-based label propagation techniques (described in further detail below in reference to FIG. 2) known risk labels (e.g., risk scores) may be propagated from labeled computational nodes to non-labeled computational nodes. A computational node that is closer to a labeled computational node (e.g., in terms of a number of hops) may have a propagated risk score that is more similar to the labeled abusive computational nodes relative to unlabeled computational nodes that are further away from the labeled abusive computational nodes, indicating a higher degree of risk that the unlabeled computational node is abusive.

Figure 2:
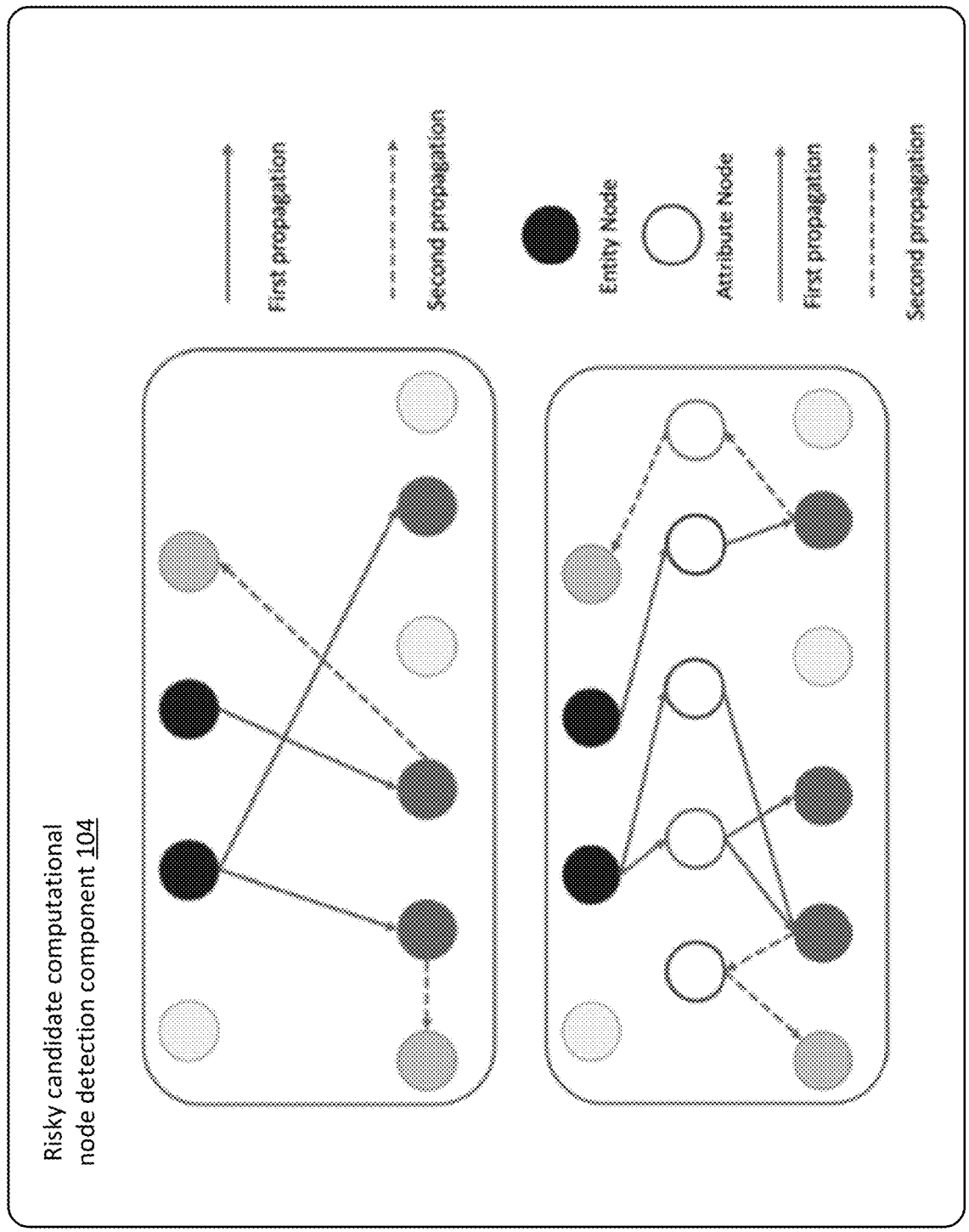
FIG. 2 is a diagram illustrating an example of graph-based label propagation, in accordance with various embodiments of the present disclosure.

As described in further detail below in reference to FIG. 2, graph-based label propagation initializes the risky score of labelled abuse nodes as 1.0 and propagates their labels through the graph. FIG. 2 illustrates a single iteration; however, it should be noted that any number of iterations may be used to propagate labels through input graph 106. The result of the graph-based label propagation is the generation of likely risk labels for all unlabeled nodes based on their similarity to and distances from seed nodes (e.g., the labeled nodes). After propagating the labels, the risky candidate computational node detection component 104 includes instructions effective to select candidate nodes from the unlabeled nodes with risk scores that are greater than (or equal to) certain pre-defined threshold risk scores. In some examples, the computational nodes with propagated risk scores greater than the predefined (e.g., F1 optimized) threshold risk score may be subject to an automated action such as account suspension, network access termination, account termination, removal of data from a server, etc.

The risky candidate computational node detection component 104 may include one or more machine learning models that may evaluate the input graph 106 to determine high risk candidates (e.g., after label propagation) at action 108. For example, a subgraph may be extracted from input graph 106 for one or more candidate computational nodes of interest (e.g., all computational nodes representing accounts for a particular service in a bi-partite graph with account computational nodes and data computational nodes representing data generated by the accounts). The subgraph may include the candidate computational nodes of interest and their neighbors (e.g., all computational nodes within 1-hop) and may condense such graph neighborhood connectivity patterns into low-dimensional embeddings (e.g., numerical representations of the graph neighborhood connectivity patterns and/or graph nodes) for abuse detection using the machine learning architecture depicted and described in reference to FIG. 3. Action 108 may compute updated risk scores of unlabeled computational nodes based on the embeddings of subgraphs for labeled nodes and unlabeled nodes of interest.

Interpretation Component

Interpretation component 110 may include instructions that may be used to generate interpretation information for risky candidates output by the risky candidate computational node detection component 104. Interpretation information enables the graph-based abusive computational node detection system 102 to interpret how the risky candidates are selected by the risky candidate computational node detection component 104 and to rank different risky candidates in a prioritized order for remedial actions. Two sub-components are included in this module: the rank candidates component 112 and the update interpretation component 114.

A subgraph inducing method is used by the interpretation component 110 to interpret why a computational node in the input graph 106 has been detected as risky candidate (e.g., the output of the risky candidate computational node detection component 104 after label propagation. The induced subgraph data (discussed in further detail below in reference to FIG. 4) represents the paths in the input graph 106 that highlight how the risk score is propagated from confirmed abusive computational nodes to each newly-found potentially abusive candidate computational node. Typically, the subgraph tells which confirmed abusive computational nodes are vital to each risky candidate computational node and illustrates their interaction.

Before discussing how to generate the above-described induced subgraph data, the way in which the risky candidate computational nodes are selected after graph-based label propagation is first discussed. For label propagation graph models, the risky candidate computational nodes for investigation are selected from unlabeled entities i that satisfy the following condition:

risky score of node $i \geq \tau$ where $\tau$ is the pre-defined threshold risk score.

Intuitively, for any risky candidate computational node, there should be some neighbors in the input graph 106 where the neighbor nodes are either confirmed abusive or highly risky (e.g., risky score$\geq \tau$). These neighbors are an essential one last hop in the risk propagation paths from some confirmed abusive computational nodes to this candidate computational nodes. For each of these neighbors, this process may be repeated to find its own neighbor with risky score$\geq \tau$ to reconstruct the path. This process is repeated until a labeled node (e.g., a known abusive computational node) is found and the complete path is built. Note that this path describes how the labels of confirmed abusive computational nodes (labeled computational nodes) are propagated to the newly found candidate computational nodes (risky score$\geq \tau$), which therefore interprets the propagation process. Also, the paths support efficient investigation because only the nodes along the path should be examined to decide if the candidate is truly abusive or not. A theoretical proof for the induced subgraph is provided below in reference to FIG. 4. The induced subgraph reduces the size of the input graph by more than 90% while preserving the risky propagation paths for every candidate abusive node.

The rank candidates component 112 may be used to prioritize investigation for candidate abusive nodes. For example, candidates with higher likelihood of being abusive may be prioritized for investigation and/or automated remedial actions. For example, the rank candidates component 112 may execute the graph-based label propagation method over the current induced subgraph and may re-rank all remaining candidate abusive nodes based on their updated risk score after label propagation. As the size of the induced subgraph is considerably reduced relative to the input graph 106, online and low-latency label propagation may be completed in an efficient manner using the computer-implemented techniques described herein.

Update interpretation component 114 may be used to improve the accuracy of the interpretation information for ranking candidate computational nodes. The update interpretation component 114 may feed the investigation results into interpretation information generation. Typically, whenever the investigation for a batch of candidates (the size of batch is configurable in the system) is completed, the system updates the interpretation information in the induced subgraph. For example, for any computational node that is confirmed as being abusive, the risk score for the computational node may be updated to 1.0 in the induced subgraph. Otherwise, if a candidate is determined as non-abusive, the known non-abusive candidate may be removed from the induced subgraph together with all edges associated with the non-abusive computational node. Graph-based label propagation may be repeated for the updated induced subgraph to update the risk scores. Additionally, as described in further detail below, the graph-based abusive computational node detection system 102 adds the new ground truth labels into the labeled dataset used to train an improved classification model (discussed in further detail in FIG. 4).

User Interface Visualization/Investigation Component

Figure 8:
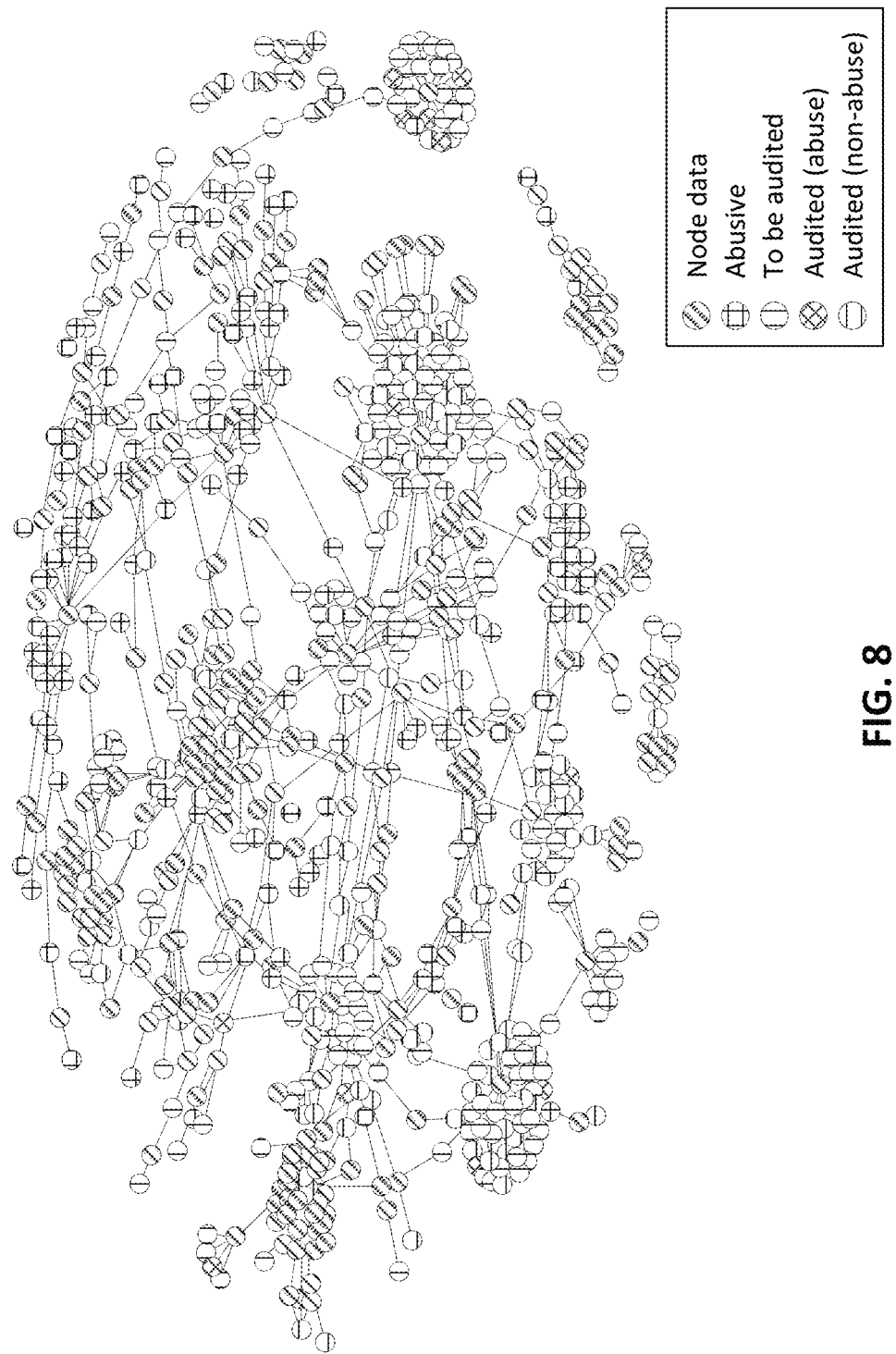
FIG. 8 depicts a node distribution plot of an induced subgraph in accordance with various aspects of the present disclosure.

User interface visualization/investigation component 116 may provide various data visualizations and/or other tools that may be used to investigate potentially abusive computational nodes identified as candidates using the risky candidate computational node detection component 104 and the interpretation component 110. For a given candidate computational node, the system allows different types of data to be queried and shows the query results as a plot. For example, For example, user interface visualization/investigation component 116 may provide a node distribution plot. The node distribution plot (FIG. 8) illustrates the locations of different type of nodes (e.g., candidate computational nodes, confirmed abusive computational nodes, confirmed non-abusive computational nodes). As the plot highlights the areas of candidate computational nodes that are more likely to be truly abusive investigation tools may use this density information for prioritization.

Figure 9:
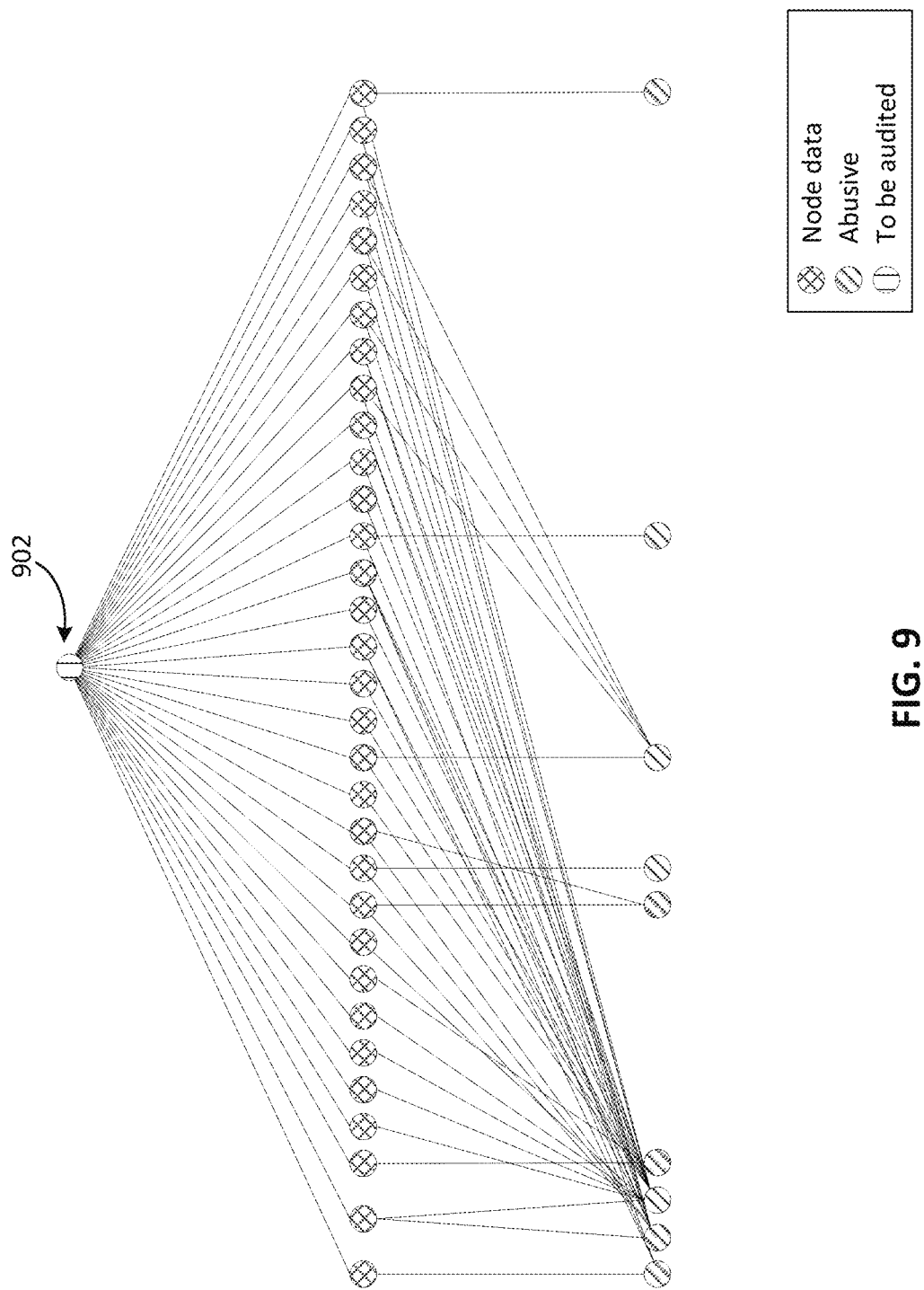
FIG. 9 depicts a k-hop neighbors plot for a candidate node, in accordance with various aspects of the present disclosure.
Figure 10:
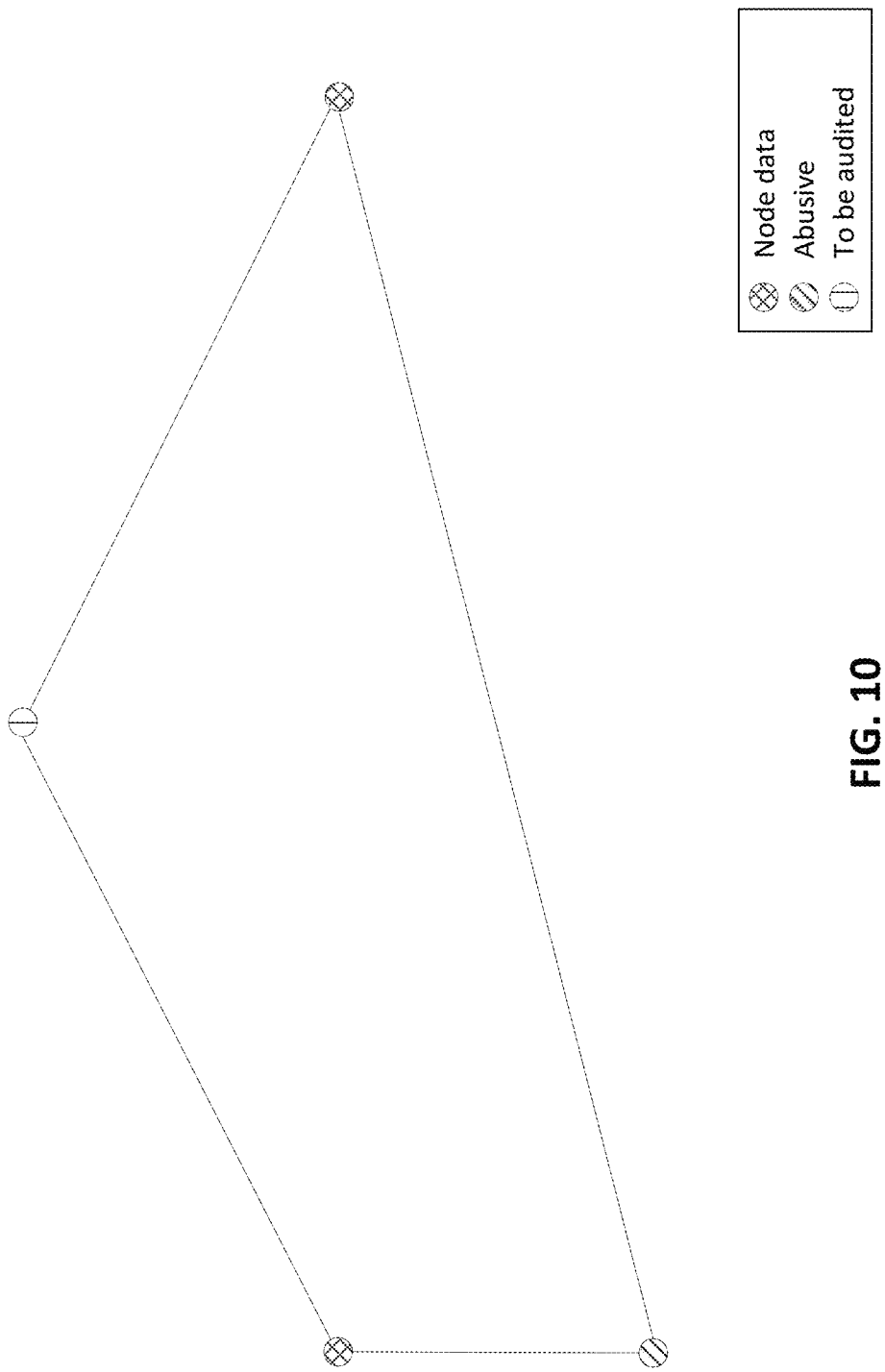
FIG. 10 depicts a shortest path plot in accordance with various aspects of the present disclosure.

In another example, user interface visualization/investigation component 116 may provide a plot for k-hop neighbors of the candidate nodes (FIG. 9). The plot for k-hop neighbors shows the connections between a candidate computational node and its neighbors. This plot helps the investigation when the investigation result of a candidate computational node (e.g., the "To be audited" node 902) is determined by its neighbors (e.g., a computational node may be enforced only if the computational node contributes more than certain number of other computational nodes representing abusive data generated by that computational node). User interface visualization/investigation component 116 may provide a plot of the shortest path between the candidate computational node and a confirmed abusive computational node. The plot of shortest path between the candidate computational node and some confirmed abusive computational node (FIG. 10) shows the interactions and risk propagation paths between them. This plot can help to verify the abuse propagation along the path.

In addition, the user interface visualization/investigation component 116 may provide access to external tools and/or data sources. For example, hyperlinks may be provided in a UI to link to the various data associated with a particular candidate abusive computational node and/or to external tools that may be used to provide information about the candidate abusive computational node. For example, external tools may be used to determine particular attribute values for data associated with a particular candidate abusive computational node.

FIG. 2 is a diagram illustrating an example of graph-based label propagation, in accordance with various embodiments of the present disclosure. Given a multi-partite input graph 106, graph-based label propagation is used to propagate risk score from labeled computational nodes to related computational nodes in the input graph 106.

The graph-based label propagation model generates risk scores for entities based on their relational linkages in a multi-partite graph. It can be considered as a belief propagation and implemented under a recursive matrix-vector multiplication formulation. In spite of the simplicity and computational efficiency, the multipartite label propagation model is highly scalable.

One fundamental difference between the multi-partite risk propagation and the classic single-partite lies in the propagation logic. Single-partite graph propagates the risk score label along shared attributes. In input graph 106, each attribute serves as an edge in the graph. Though simple and clear, it can only support one class of entity node connected with single attribute type. Accordingly, the nodes in a single-partite graph represent a single entity type of computational node (e.g., webpage Uniform Resource Locators (URLs), IP addresses, city, account, etc.). Edges may represent an attribute along which the computational nodes are parsed (e.g., shared fingerprint, IP address, account, etc.).

Multi-partite graphs contain two types of nodes: entity node and attribute node. The risk score propagates between the connection between entity node and attribute node. The edge is a connecting relation between attribute and entity, instead of attribute itself. Accordingly, two entity nodes are only associated through the shared attribute nodes. As shown in FIG. 2, entity computational nodes are never directly connected with an edge and are instead connected via attribute computational nodes. For example, entity computational nodes may be accounts and attribute computational nodes may be IP addresses.

The graph-based label propagation begins with a list of labeled abusive and/or non-abusive computational nodes, such as known bad actors that have taken non-permitted actions. These confirmed abuse computational nodes initialize the corresponding nodes' risk score as 1.0. The risk vectors for each node are then iteratively updated category by category.

Algorithm 1: Risk Propagation in Multipartite Graph
for t in 1, 2, ..., T:
  for q in ε:
    // update attribute risk vectors from entity risk vectors for p in $\mathcal{A}$
    and q ≠ p:
      $\tilde{\phi}^p = A^{pq} \cdot \phi^q$
    // update current entity risk vector with all attribute vectors For p
    in $\mathcal{A}$:
      $\phi^q \mathrel{+}= \alpha^t \cdot w^p \cdot A^{qp} \cdot \tilde{\phi}^p$ Algorithm 1 summarizes the graph-based label propagation workflow. Here ε denotes the entity computational node set; $\mathcal{A}$ denotes the attribute computational node set; $\tilde{\phi}^p$, $\phi^q$ are the risk vector of attribute computational nodes and entity computational nodes, respectively. $w^p$ is the weight for entity computational node p. α is an attenuation factor.

At each iteration, the risk vector of each entity computational node is updated concurrently. For each entity computational node, the associated risk vectors of attribute nodes are first updated with the entity risk vectors obtained from previous iteration. The entity risk vectors are then updated from related attribute risk vectors.

A major difference between the risk vector for attribute computational nodes and entity computational nodes is that the attribute risk vector is associated to particular entity computational node. It is not an intrinsic property of the attribute computational node. Even in the same iteration t, the updated attribute risk vector $\tilde{\phi}^p$ varies across different entity computational node q. On the contrary, the entity risk vector $\phi^q$ is only updated along the iteration steps. It is an intrinsic property of the entity computational node q.

Figure 3:
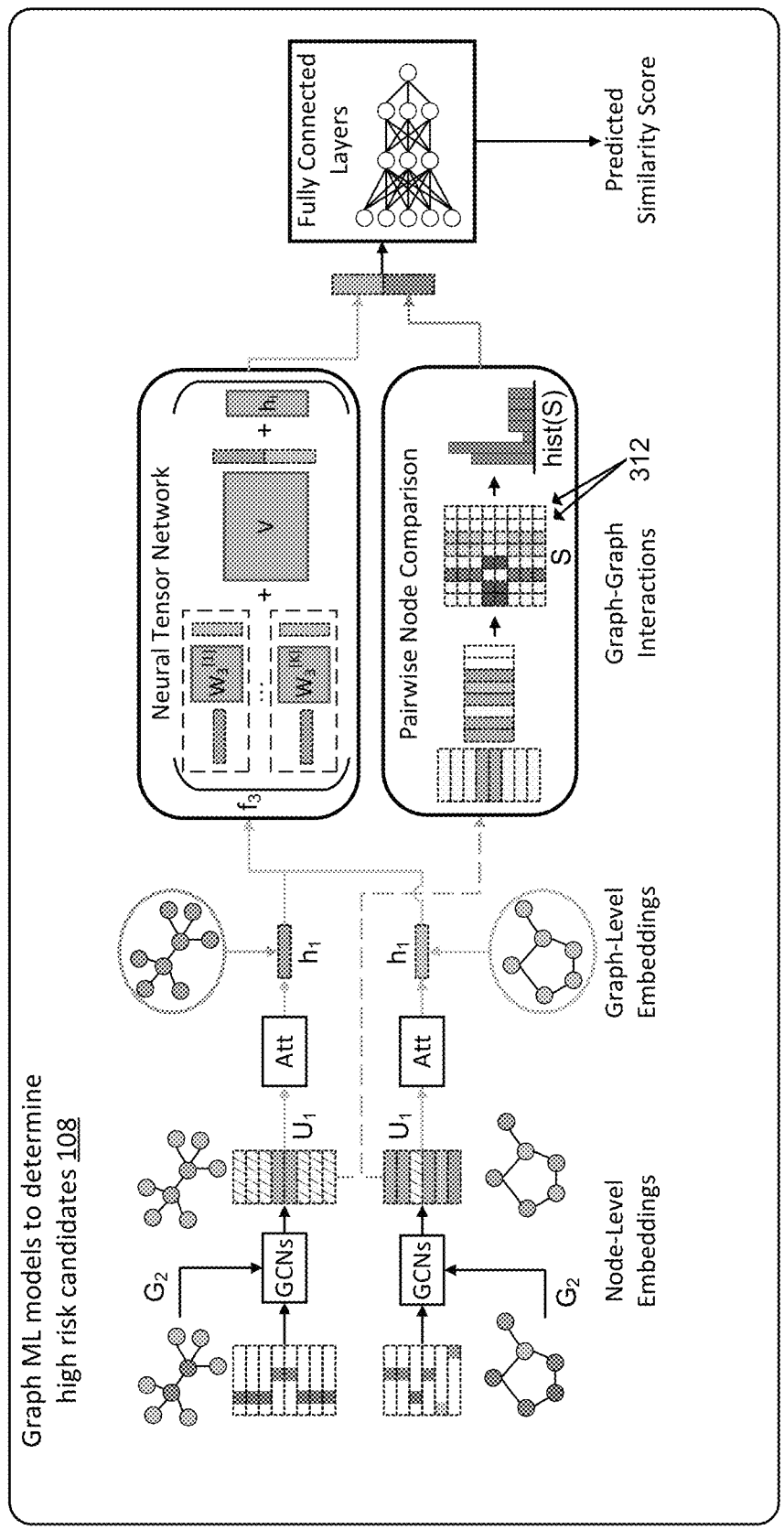
FIG. 3 is a block diagram illustrating an example machine learning architecture for determining similarity at a computational node and graph level, in accordance with various aspects of the present disclosure.

FIG. 3 is a block diagram illustrating an example machine learning architecture for determining similarity at a computational node and graph level, in accordance with various aspects of the present disclosure. It should be noted that the architecture shown in FIG. 3 is but one example implementation of a machine learning architecture that may be used to determine similarity at both a computational node and a graph level. The architecture of FIG. 3 may be varied in several respects according to the desired implementation. In various input graphs 106 there may be entity computational nodes (e.g., accounts) and attribute computational nodes (e.g., URLs representing data generated for a given account, IP addresses, etc.) and connections between the two. Abusive computational nodes may be identified based on their graph relationships to known abusive entities. In various examples, subgraph patterns may be used to identify such relationships and/or similarities.

The general methodology may include two steps, the subgraph embedding (both node and graph level) and graph-graph interactions.

First, because a particular computational node may be characterized by its data (with attributes of the data being represented by feature values), the first step may be to do a computational node-level and graph-level feature embedding. Graph Convolutional Networks (GCN) model is capable of encoding both graph structure and computational node features in a way useful for semi-supervised classification. A graph-level embedding is computed and node-level embeddings are aggregated using attention. The pairwise node comparison for two graphs may also be computed based on node-level embeddings.

Another goal of the architecture shown in FIG. 3 is to consider graph-graph interactions in order to calculate the similarity score between two graphs. Then an unlabeled graph may be labeled based on its similarity scores to a group labeled as abusive graphs and/or labeled as non-abusive graphs. This approach may be referred to herein as SimGNN (similarity graph neural network), which combines two strategies. First, a learnable embedding function is described that maps every graph into an embedding vector, which provides a global summary of a graph. A novel attention mechanism is proposed to emphasize the important nodes with respect to a specific similarity metric. Second, a pairwise node comparison method is used to supplement the graph-level embeddings with fine-grained node-level information. This model has a better generalization on unseen graphs, and in the worst case runs in quadratic time with respect to the number of nodes in two graphs.

The details for each step is as follows:

Graph Convolutional Networks (GCN). A multi-layer Graph Convolutional Network (GCN) is used with the following layer-wise propagation rule:

$$H^{(l+1)} = \sigma\left(\tilde{D}^{-\frac{1}{2}} \tilde{A} \tilde{D}^{-\frac{1}{2}} H^{(l)} W^{(l)}\right). \quad (3.1)$$

Here, $\tilde{A} = A + I_N$ is the adjacency matrix of the undirected graph G with added self-connections. $I_N$ is the identity matrix, $\tilde{D}_{ii} = \Sigma_j \tilde{A}_{ij}$ and $W^{(l)}$ is a layer-specific trainable weight matrix. $\sigma(\cdot)$ denotes an activation function, such as the ReLU($\cdot$)=max(0, $\cdot$). $H^{(l)} \in \mathbb{R}^{N \times D}$ is the matrix of activations in the $l^{th}$ layer; $H^{(0)} = X$.

The graph convolution, which operates on the representation of a node and denoted as $u_n \in \mathbb{R}^D$, may be formulated as:

$$conv(u_n) = f_1\left(\sum_{m \in \mathcal{N}(n)} \frac{1}{\sqrt{d_n d_m}} u_m W_1^{(l)} + b_1^{(l)}\right) \quad (3.2)$$

where $\mathcal{N}$ (n) is the set of the first-order neighbors of node n plus n itself, $d_n$ is the degree of node n plus 1, $W_1^{(l)} \in \mathbb{R}^{D^l \times D^{l+1}}$ is the weight matrix associated with the l-th GCN layer, $b_1^{(l)} \in \mathbb{R}^{D^{l+1}}$ is the bias, and $f1(\cdot)$ is an activation function such as ReLU(x)=max(0, x). Intuitively, the graph convolution operation aggregates the features from the first-order neighbors of the node.

SimGNN. The SimGNN is an end-to-end neural network based approach that attempts to learn a function to map a pair of graphs into a similarity score. The SimGNN is illustrated in FIG. 3. First, the SimGNN transforms the computational node of each graph into a vector, encoding the features and structural properties around each node. Then, two strategies are proposed to model the similarity between the two graphs, one based on the interaction between two graph-level embeddings, the other based on comparing two sets of node-level embeddings. Finally, two strategies are combined together to feed into a fully connected neural network to get the final similarity score. The two strategies are described in additional detail below.

Graph-Level Embedding Interaction. This strategy is based on the assumption that a good graph-level embedding can encode the structural and feature information of a graph, and by interacting the two graph-level embeddings, the similarity between two graphs can be predicted. It involves the following stages: (1) the node embedding stage, which transforms each node of a graph into a vector, encoding its features and structural properties; (2) the graph embedding stage, which produces one embedding for each graph by attention-based aggregation of node embeddings generated in the previous stage; (3) the graph-graph interaction stage, which receives two graph-level embeddings and returns the interaction scores representing the graph-graph similarity; and (4) the final graph similarity score computation stage, which further reduces the interaction scores into one final similarity score. It will be compared against the ground-truth similarity score to update parameters involved in the 4 stages.

Stage I: Node Embedding. GCN learns an aggregation function (Eq. 3.2) that are representation-invariant and can be applied to unseen nodes. In FIG. 3, different shading patterns represent different computational node types, and the original computational node representations are feature vector encoded. Notice that the feature vector encoding is based on computational node itself, so even if the node IDs are permuted, the aggregation results are the same. After multiple layers of GCNs (e.g., 3 layers in FIG. 3), the computational node embeddings U are ready to be fed into the Attention module (Att), which is described as follows.

Stage II: Graph Embedding: Global Context-Aware Attention. To generate one embedding per graph using a set of computational node embeddings, the following attention mechanism is used to allow the model to learn weights guided by a selected similarity metric.

Denote the input node embeddings as $U \in \mathbb{R}^{N \times D}$, where the n-th row, $u_n \in \mathbb{R}^D$ is the embedding of node n. First, a global graph context $c \in \mathbb{R}^D$ is computed, which may be a simple average of node embeddings followed by a nonlinear transformation:

$$c = \tanh\left(\frac{1}{N} W_2 \sum_{n=1}^{N} u_n\right) \quad (3.3)$$

where $W_2 \in \mathbb{R}^{D \times D}$ is a learnable weight matrix. The context c provides the global structural and feature information of the graph that is adaptive to the given similarity metric, via learning the weight matrix. Based on c, one attention weight for each node is computed. For node n, to make its attention $a_n$ aware of the global context, the inner product between c and its node embedding is determined. The intuition is that, nodes similar to the global context should receive higher attention weights. A sigmoid function $$\sigma(x) = \frac{1}{1 + \exp(-x)}$$

is applied to the result to ensure the attention weights is in the range (0, 1). The weights may not be normalized into length 1, since it is desirable to let the embedding norm reflect the graph size, which is essential for the task of graph similarity computation. Finally, the graph embedding $h \in \mathbb{R}^D$ is the weighted sum of node embeddings, $h = \Sigma_{n=1}^N a_n u_n$. The following equation summarizes the proposed node attentive mechanism:

$$h = \sum_{n=1}^{N} f_2(u_n^T c) u_n = \sum_{n=1}^{N} f_2\left(u_n^T \tanh\left(\frac{1}{N} W_2 \sum_{m=1}^{N} u_m\right)\right) u_n \quad (3.4)$$

where $f_2(\bullet)$ is the sigmoid function $\sigma(\bullet)$.

Stage III: Graph-Graph Interaction: Neural Tensor Network. Neural Tensor Networks (NTN) may be used to model the relation between two graph-level embeddings:

$$g(h_i, h_j) = f_3\left(h_i^T W_3^{[1:K]} h_j + V \begin{bmatrix} i \\ h \end{bmatrix} + b_3\right) \quad (3.5)$$

where $W_3^{[1:K]} \in \mathbb{R}^{D \times D \times K}$ is a weight tensor, [ ] denotes the concatenation operation, $V \in \mathbb{R}^{K \times 2D}$ is a weight vector, $b_3 \in \mathbb{R}^K$ is a bias vector, and $f_3(\bullet)$ is an activation function. K is a hyperparameter controlling the number of interaction (similarity) scores produced by the model for each graph embedding pair.

Stage IV: Graph Similarity Score Computation. After obtaining a list of similarity scores, a standard multi-layer fully-connected neural network is applied to gradually reduce the dimension of the similarity score vector. In the end, one score, $s_{ij} \in \mathbb{R}$, is predicted, and it is compared against the ground-truth similarity score using the following cross-entropy loss function:

$$\mathcal{L} = \frac{1}{|\mathcal{D}|} \sum_{(i,j) \in \mathcal{D}} -(s_{i,j} \log(\hat{s}_{i,j}) + (s_{i,j}) \log(1 - \hat{s}_{i,j})) \quad (3.6)$$

where $\mathcal{D}$ is the set of training graph pairs, and $s_{i,j}$ is the ground-truth similarity between $\mathcal{G}_i$ and $\mathcal{G}_j$.

Pairwise Node Comparison. To better use the node-level information, an additional step may be added in the graph-graph interactions by by-passing the NTN module, and using the node-level embeddings directly. This step may be used to supplement the graph-level features (graph features), which may lead to extra performance gain for the model.

As illustrated in the flow of FIG. 3, if $\mathcal{G}_i$ has Ni nodes and $\mathcal{G}_j$ has $N_j$ nodes, there would be $N_i N_j$ pairwise interaction scores, obtained by $S = \sigma(U_i U_j^T)$, where $U_i \in \mathbb{R}^{N_i \times D}$ and $U_j \in \mathbb{R}^{N_j \times D}$ are the node embeddings of $\mathcal{G}_i$ and $\mathcal{G}_j$, respectively. Since the node-level embeddings are not normalized, the sigmoid function may be applied to ensure the similarities scores are in the range of (0, 1). For two graphs of different sizes, to emphasize their size difference, fake nodes may be padded to the smaller graph. As shown in FIG. 3, two fake nodes with zero embedding are padded to the bottom graph, resulting in two extra columns with zeros in S (e.g., columns 312). Denote $N = \max(N_1, N_2)$. The pairwise node similarity matrix $S \in \mathbb{R}^{N \times N}$ is a useful source of information, since it encodes fine-grained pairwise node similarity scores. Tts histogram features: $hist(S) \in \mathbb{R}^B$ may be extracted, where B is a hyperparameter that controls the number of bins in the histogram. In the case of FIG. 3, seven bins are used for the histogram (although other numbers of bins may be used in accordance with desired implementation). The histogram feature vector is normalized and concatenated with the graph-level interaction scores $g(h_i, h_j)$, and fed to the fully connected layers to obtain a final similarity score for the graph pair.

Initial labeled training sets and testing sets may be used to generate an initial model for the architecture of FIG. 3. However, in some cases, the output detected results may be sent to investigators that may generate additional label annotations. As more confirmed true abusive computational nodes and/or non-abusive computational nodes, the new datasets may be returned to the model pipeline and used to update the parameters, improving model performance.

Figure 4:
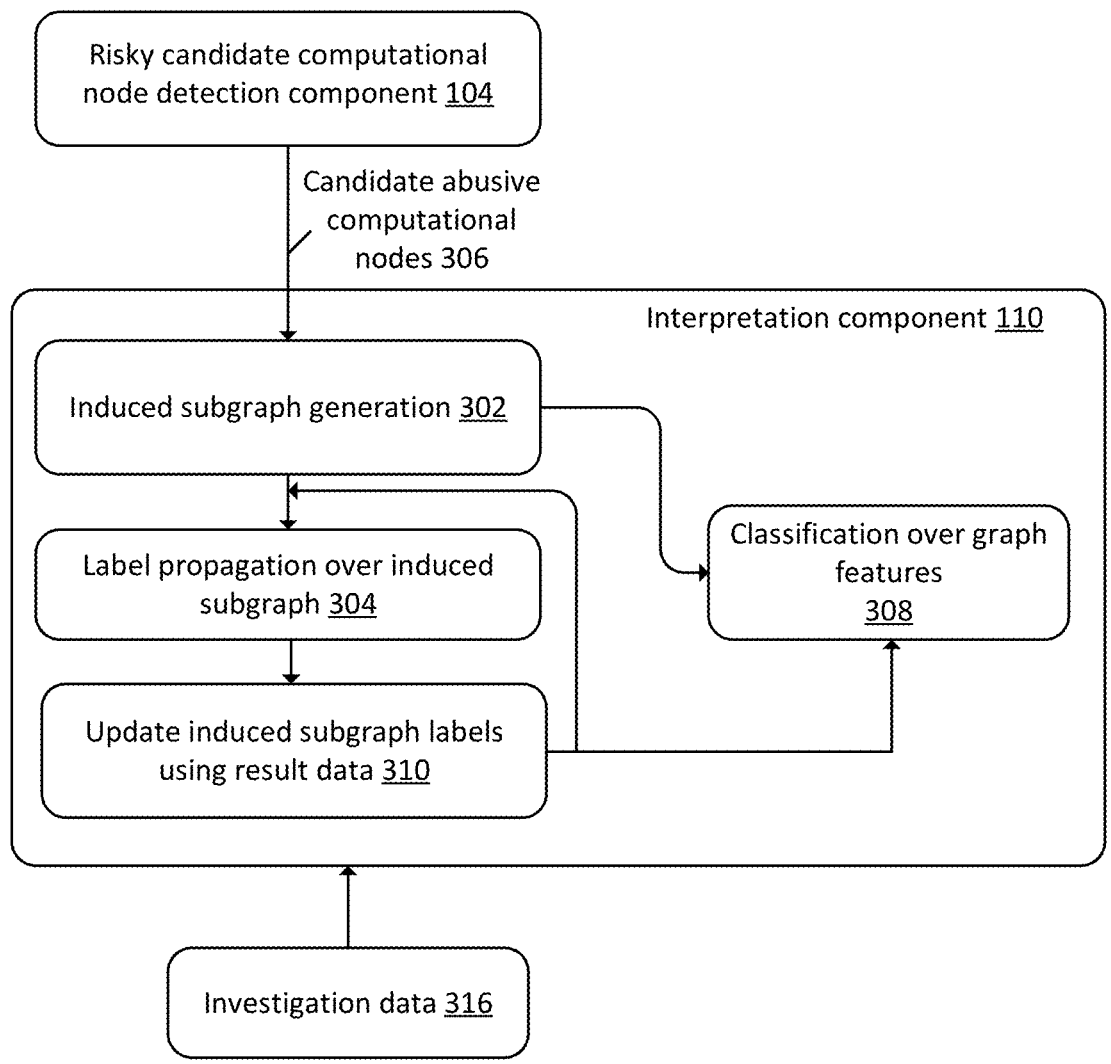
FIG. 4 is a block diagram illustrating a recursive graph-based method for detection of abusive computational nodes, in accordance with various aspects of the present disclosure.

FIG. 4 is a block diagram illustrating a recursive graph-based method for detection of abusive computational nodes, in accordance with various aspects of the present disclosure. Risky candidate computational node detection component 104 may output candidate abusive computational nodes 306. The candidate abusive computational nodes 306 may be determined using the machine learning architecture described above in reference to FIG. 3.

To interpret why a computational node in the input graph 106 is detected as a risky candidate computational node when the label propagation is adopted for risky candidate generation, an induced subgraph is generated (induced subgraph generation 302) to find the paths that highlight how the risk is propagated from confirmed abusive computational nodes to each newly found abusive candidate computational node. Typically, this subgraph tells which confirmed abusive computational nodes are vital to each risky candidate and illustrates their interaction.

Intuitively, for any risky candidate (e.g., a potentially abusive computational node), there should be some neighbors (e.g., URLs and/or other attributes associated with an abusive account) where the neighbor computational nodes are either confirmed abusive or highly risky (i.e., risk score≥τ). These neighbors are essential one last hop in the risk propagation paths from some confirmed abusive computational nodes to the candidate. For each of these neighbors, this process is repeated to find its own neighbor with risk score≥τ, to reconstruct the path. This process is repeated until a labeled computational node is found (e.g., a computational node with risk score=1) and the complete path is built. Note that this path describes how the labels of confirmed abuse entities (labeled computational nodes) are propagated to the newly found candidates (risky score≥τ), which therefore interprets the propagation process. Also, the paths provide the clue for support efficient investigation because only the nodes along the path may be examined to determine if the candidate computational node is truly abusive or not.

[Theorem] For any node i with risky score≥τ, there is at least one path that starts from a labeled computational node (i.e., risk score=1.0) and ends with the computational node i, where the risk scores of all other computational nodes j in the path are not less than the threshold τ.

Proof: Assuming the input graph is a bi-partite graph with two types of nodes (e.g., accounts and IP addresses). Initially, some computational nodes are labeled (e.g., a list of confirmed abusive accounts) and initialized with risk score 1.0, while all other unlabeled computational nodes are initialized with risk score 0.0. Then, the propagation method repeats the following process for updating risk scores until coverage:

$$\bar{\theta} = A_R \bar{\Phi};$$

$\overline{\Phi}=\lambda A_C \overline{\theta}+(1-\lambda)\overline{\Phi}$ where $A=a_{ij}$ is the m×n adjacency matrix, with m rows (e.g., accounts) and n column (e.g., IP addresses)

$A_R$: Row-normalized adjacency matrix (m×n)

$A_C$: Column-normalized adjacency matrix and transposed (n×m)

$\overline{\Phi}$: The vector of risky scores for the first type of nodes (i.e., n×1 ASIN risky score vector)

$\overline{\theta}$: The vector of risky scores for the second type of nodes (i.e., m×1 Seller risky score vector)

λ: Blending weight (0≤λ≤1)

Case 1: If computational node i belongs to the second type of computational nodes, its risk score is computed by the equation $\overline{\theta}=A_R\overline{\Phi}$. Typically, the risk score of computational node i is the dot product of the i-row of $A_R$ and the vector $\overline{\Phi}$. Considering $A_R$ is the row-normalized adjacency matrix with all values being [0, 1], there is at least one item in $\overline{\Phi}$ with score≥τ when the dot product is ≥τ. In other words, there is at least one neighbor node for computational node i has risk score≥τ.

Case 2: If computational node i belongs to the first type of computational nodes, its risk score is computed by the equation $\overline{\Phi}=\lambda A_C\overline{\theta}+(1-\lambda)\overline{\Phi}$. It can be reformulated as $\overline{\Phi}=\lambda A_C\overline{\theta}$. Therefore, the risk score of node i is the dot product of the i-row of $A_c$ and the vector $\overline{\theta}$, followed by the multiplication of a factor λ. Considering that 0≤λ≤1, the dot product of the i-row of $A_c$ and the vector $\overline{\theta}$ must be ≥τ if the risk score of computational node i≥τ. Considering all values of $A_C$ being [0, 1], there is at least one item in $\overline{\theta}$ with score≥τ when the dot product is ≥τ. In other words, there is at least one neighbor computational node of node i has risky score≥τ. This proof also holds for label propagation over uni-partite graph, multi-partite graph, and directed graph.

After generating the induced subgraph, label propagation over the induced subgraph 304 may be performed and may rank all remaining candidate computational nodes based on their updated risk scores after label propagation. As the size of the induced subgraph is significantly reduced, such online label propagation may be efficiently completed. In various examples, a classifier may be trained to perform classification over graph features 308.

For every candidate computational node to be investigated, the interpretation component 110 may extract various graph features (e.g., Degree Centrality, Eigenvector Centrality, Local Clustering Coefficient, Shortest Distances from Confirmed Abusive Nodes, Number of Confirmed Abusive Nodes within k-hop, etc.) and may leverage historical investigation results to train a supervised classification model. The model predicts the probability of a candidate to be abusive. The system ranks all candidate computational nodes based on their classification result.

Investigation results included in investigation data 316 (e.g., investigation results of investigations of highly-ranked candidate computational nodes) may be used to update induced subgraph labels (action 310) and may also be used to provide additional labeled training data for training the classifiers (e.g., as updated ground truth data). For example, whenever the investigation for a batch of candidate computational nodes (the size of batch is configurable in the system) is completed, the system may updates the interpretation information (adopted in candidate ranking). For example, for label propagation over the induced subgraph, for every computational node in the batch, if the candidate computational node is confirmed as abusive (e.g., during investigation), the system updates its label to 1.0 in the induced subgraph; otherwise, the system removes this computational node from the induced subgraph and deletes all edges associated with it. In this way, the system utilizes the real-time investigation results to update the induced subgraph for better ranking of remaining candidates.

Additionally, for classification over graph features 308, the system adds the batch of investigated nodes into the labelled dataset collected from historical investigation. The augmented dataset enables the training of an improved classification model.

Figure 5:
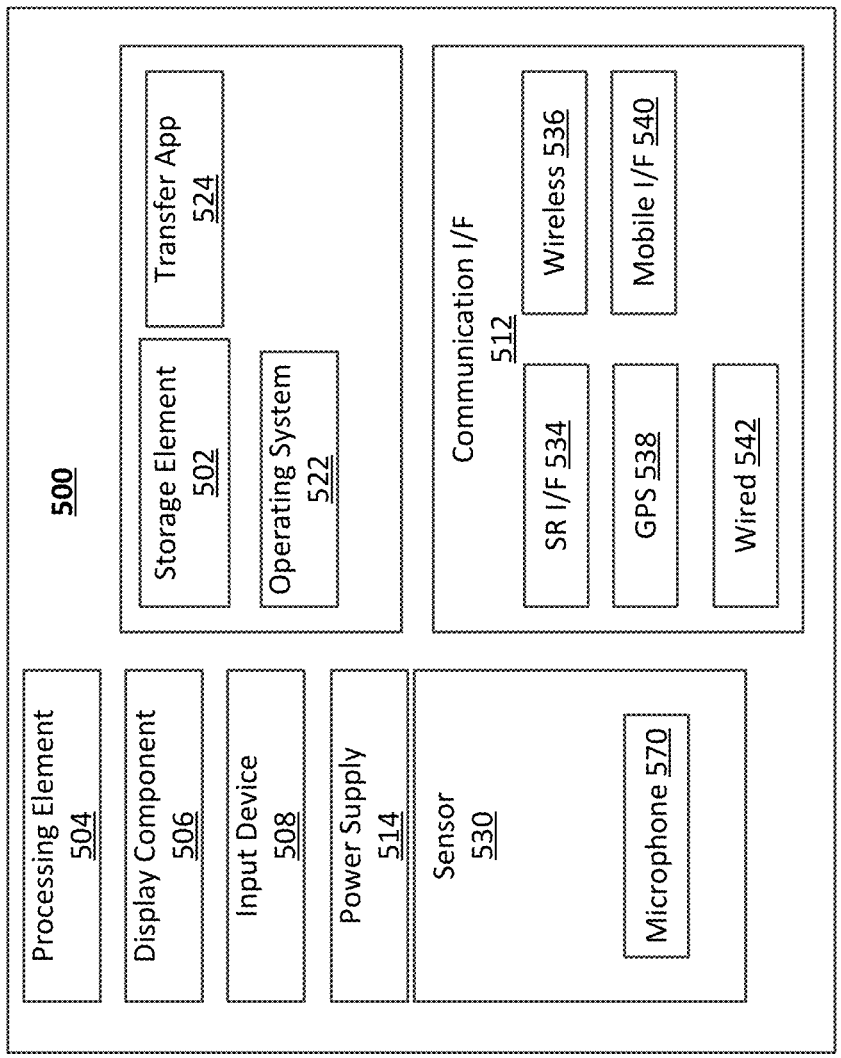
FIG. 5 is a block diagram showing an example architecture of a computing device that may be used in accordance with various embodiments described herein.

FIG. 5 is a block diagram showing an example architecture 500 of a computing device that may be configured to perform graph-based detection of abusive computational nodes, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or hierarchical data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 105, according to any suitable wireless protocol, such as Institute of Electrical and Electronics Engineers (IEEE) 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the universal serial bus (USB) protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
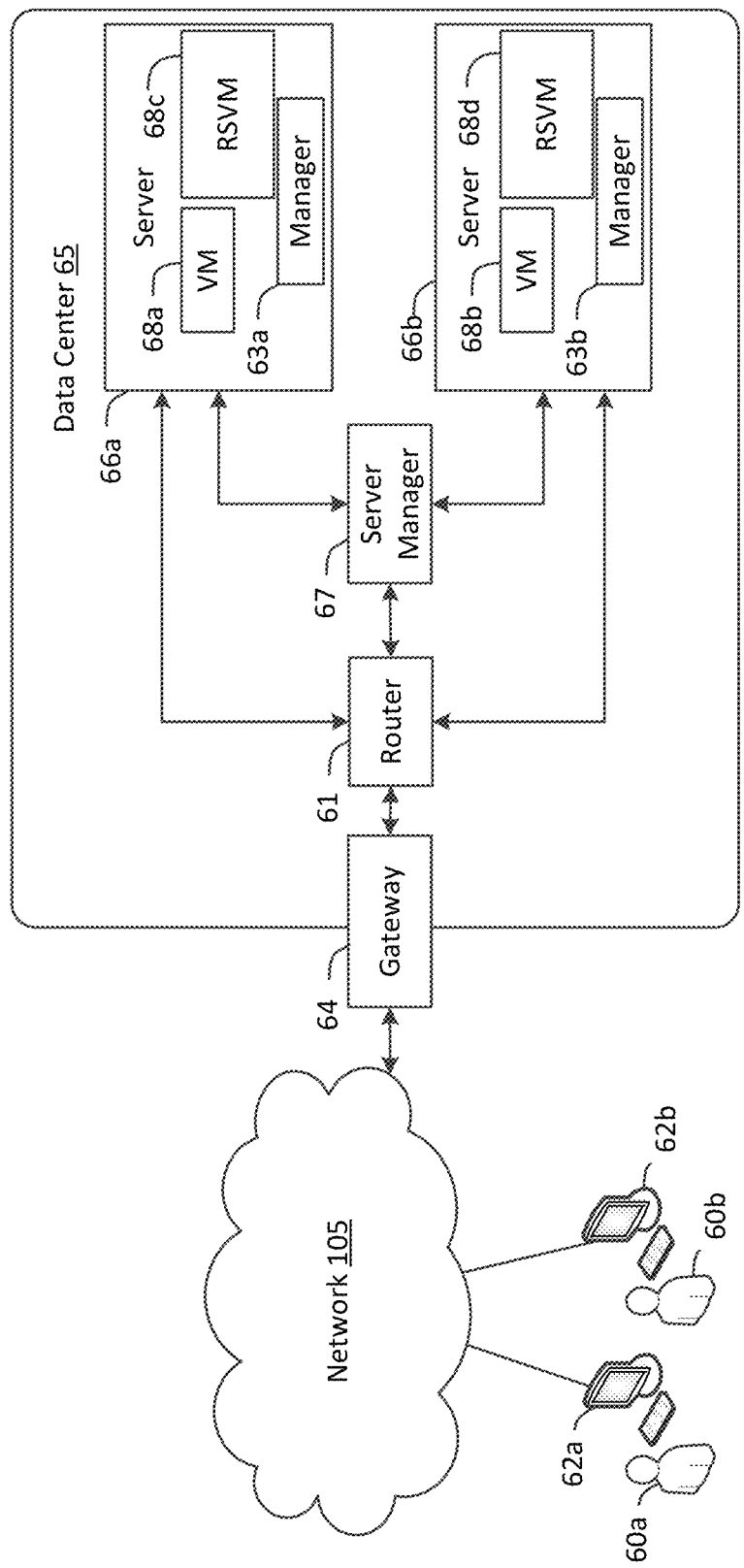
FIG. 6 is a diagram illustrating an example system for sending and providing data that may be used in accordance with the present disclosure.

An example system for sending and providing data and performing graph-based detection of abusive computational nodes will now be described in detail. In particular, FIG. 6 illustrates an example computing environment in which the embodiments described herein may be implemented. For example, the computing environment of FIG. 6 may be configured to perform graph-based detection of abusive computational nodes as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 105. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various graph-based detection of abusive computational node techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 105 may, for example, be a publicly accessible network of linked networks and possibly operated by various distinct parties, such as the Internet. In other embodiments, network 105 may be a private network, such as a corporate or university network that is wholly or partially inaccessible to non-privileged users. In still other embodiments, network 105 may include one or more private networks with access to and/or from the Internet.

Network 105 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 105. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of central processing unit (CPU), the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
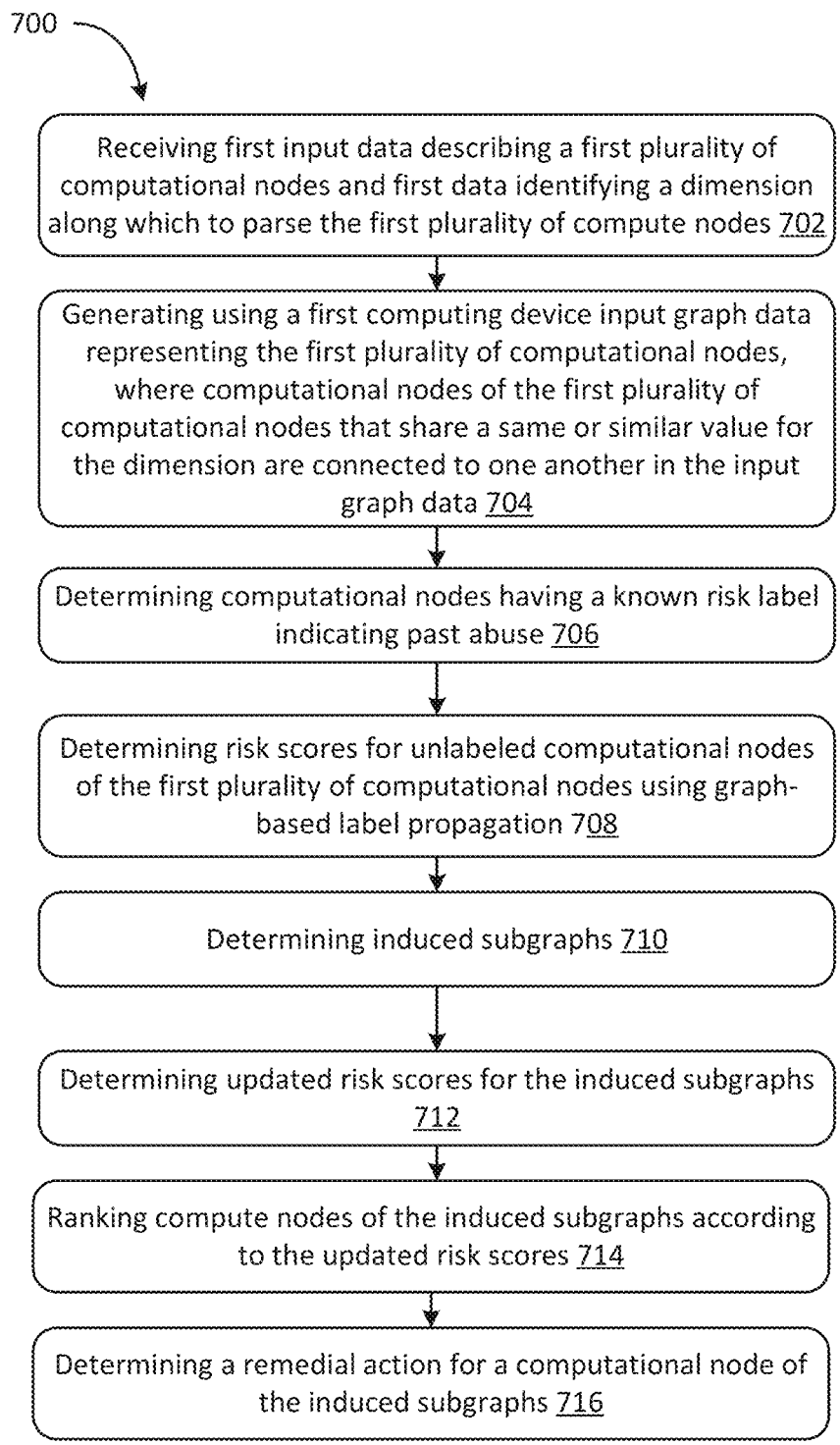
FIG. 7 is a flow diagram illustrating an example process for graph-based abusive computational node detection, in accordance with various aspects of the present disclosure.

FIG. 7 is a flow diagram illustrating another example process 700 for graph-based abusive computational node detection, in accordance with various aspects of the present disclosure. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6.

Process 700 may being at action 702, at which first input data describing a first plurality of computational nodes may be received. Additionally, first data identifying one or more dimensions along which to parse the first plurality of computational nodes may be received. For example, the first data may instruct a graph-building algorithm to generate a graph in which each computational node sharing a first attribute (e.g., IP address) may be connected in the graph. In some examples, multiple attributes may be used to parse the first plurality of computational nodes. For example, the first data may instruct that nodes sharing data associating the computational node with a first city and a first IP address be connected in the graph.

Processing may continue at action 704, at which a first computing device may generate input graph data representing the first plurality of computational nodes. The nodes that share the same or a similar value for the dimension may be connected to one another in the input graph data. At action 706, computational nodes having a known risk label indicating past abuse may be determined. For example, a first compute node having a known risk label indicating past abuse (e.g., a labeled computational node) may be determined. At action 708, risk scores for unlabeled computational nodes of the first plurality of computational nodes may be determined using graph-based label propagation. For example, a first risk score for an unlabeled computational node of the first plurality of computational nodes may be determined using graph-based label propagation as described above. Although not shown in FIG. 7, a subgraph embedding (e.g., embedding data) may be extracted for the first computational node and may be used to determine a similarity between the first computational node and a labeled known that is known to be abusive.

At action 710, induced subgraphs may be determined. For example, an induced subgraph for the first computational node may be determined by connecting a path to a labeled known abusive node from the first computational node. At action 712, updated risk scores may be determined for the induced subgraphs. For example, graph-based label propagation may be performed on the induced subgraph to generate updated risk scores for the computational nodes of the induced subgraph. At action 714, computational nodes of the induced subgraph may be ranked according to the updated risk scores. At action 716, a remedial action may be determined for a computational node of the induced subgraph based at least in part on the updated risk scores. Investigation and/or other remedial action results may be used to update risk scores and/or training data used to train classifier models.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of detecting abusive computational nodes, the method comprising:
receiving first input data describing a first plurality of computational nodes and first data identifying a dimension along which to parse the first plurality of computational nodes;
generating, using a first computing device, input graph data representing the first plurality of computational nodes, wherein computational nodes of the first plurality of computational nodes that share a same value for the dimension are connected to one another in the input graph data;
determining a first computational node of the first plurality of computational nodes having a known risk label indicating past abuse;
determining a first risk score for a first candidate computational node of the first plurality of computational nodes using a first graph-based label propagation;
determining, for the first candidate computational node, a second computational node connected to the first candidate computational node in the input graph data and having a risk score above a threshold risk score;
determining, for the second computational node, a third computational node connected to the second computational node in the input graph data and having a risk score above the threshold risk score;
generating induced subgraph data comprising at least the first candidate computational node, the second computational node, and the third computational node;
determining, for the first candidate computational node, a second risk score that is different from the first risk score;
performing a second graph-based label propagation using the second risk score, wherein the second graph-based label propagation generates a corresponding updated risk score for each of the computational nodes of the induced subgraph data;
ranking the computational nodes of the induced subgraph data according to the updated risk scores of the computational nodes of the induced subgraph data; and
terminating network access of the second computational node, wherein the second computational node has a highest updated risk score among the updated risk scores of the computational nodes of the induced subgraph data.

2. The method of claim 1, further comprising:
generating, using a graph neural network, first embedding data representing the first computational node, the first embedding data comprising a numerical representation of the first computational node;
generating, using the graph neural network, second embedding data representing the second computational node, the second embedding data comprising a numerical representation of the second computational node;
normalizing the first embedding data and the second embedding data using a sigmoid function;
determining a similarity score representing a similarity between the first embedding data and the second embedding data; and
terminating the network access of the second computational node further based at least in part on the similarity score.

3. The method of claim 1, wherein the induced subgraph data represents a path in the input graph data between the candidate computational node and a computational node having the known risk label indicating past abuse.

4. A method comprising:
receiving first input data describing a first plurality of computational nodes and first data identifying a dimension along which to parse the first plurality of computational nodes;
generating, using a first computing device, input graph data representing the first plurality of computational nodes, wherein computational nodes of the first plurality of computational nodes that share corresponding values for the dimension are connected to one another in the input graph data;
determining a first known abusive computational node;
performing a first graph-based label propagation for the input graph data based at least in part on the first known abusive computational node, wherein the first graph-based label propagation generates a first risk score for a first candidate computational node;
generating induced subgraph data comprising the first candidate computational node;
determining, for the first candidate computational node, a second risk score that is different from the first risk score;
performing a second graph-based label propagation using the second risk score, wherein the second graph-based label propagation generates a respective first updated risk score for each of the computational nodes of the induced subgraph data; and
terminating network access of a first computational node of the induced subgraph data based at least in part on the first updated risk score for the first computational node.

5. The method of claim 4, further comprising:
determining a second computational node of the first plurality of computational nodes having a known risk score indicating past abuse; and
determining a third risk score for an unlabeled computational node of the first plurality of computational nodes using the first graph-based label propagation based at least in part on the known risk score of the second computational node.

6. The method of claim 5, further comprising:
determining, for the second computational node, a third computational node connected to the second computational node in the input graph data and having a fourth risk score above a threshold risk score;
determining, for the third computational node, a fourth computational node connected to the third computational node in the input graph data and having a fifth risk score above the threshold risk score; and
generating the induced subgraph data comprising at least the second computational node, the third computational node, and the fourth computational node.

7. The method of claim 6, further comprising:
ranking the computational nodes of the induced subgraph data in order of ascending values of the first respective updated risk scores;
determining a highest-ranked computational node of the computational nodes of the induced subgraph data; and
terminating network access of the highest-ranked computational node.

8. The method of claim 4, further comprising:
determining a first set of graph features representing a second computational node of the first plurality of computational nodes, wherein the first set of graph features comprises at least one of degree centrality, Eigenvector centrality, local clustering coefficient, or shortest distance from a known abusive computational node; and
generating label data for the second computational node, the label data indicating that the second computational node is an abusive computational node.

9. The method of claim 8, further comprising:
training a supervised classifier using the first set of graph features and the label data;
determining a second set of graph features representing a third computational node of the first plurality of computational nodes;
inputting the second set of graph features into the supervised classifier; and
receiving first prediction data indicating a prediction of abusiveness for the third computational node.

10. The method of claim 4, further comprising:
generating second induced subgraph data comprising a second plurality of computational nodes with respective first updated risk scores above a threshold risk score that are connected in a path to one of the at least one known abusive computational nodes;
generating a respective second updated risk score for each of the second plurality of computational nodes of the second induced subgraph data based at least in part on updated ground truth data; and
terminating the network access of the first computational node further based at least in part on the second corresponding updated risk scores for each of the second plurality of computational nodes.

11. The method of claim 4, further comprising:
determining a structure of the induced subgraph data; and
generating, a graph similarity score, based on the difference between the structure of the induced subgraph and a structure of a subgraph containing at least the first known abusive computational node, wherein the terminating the network access of the first computational node is further based at least in part on the graph similarity score.

12. A system, comprising:
at least one processor; and
at least one non-transitory computer-readable memory configured in communication with the at least one processor, the at least one non-transitory computer-readable memory storing instructions that, when executed by the at least one processor, are effective to program the at least one processor to:
receive first input data describing a first plurality of computational nodes and first data identifying a dimension along which to parse the first plurality of computational nodes;
generate, using a first computing device, input graph data representing the first plurality of computational nodes, wherein computational nodes of the first plurality of computational nodes that share a same value for the dimension are connected to one another in the input graph data;
determine, a first known abusive computational node;
perform a first graph-based label propagation for the input graph data based at least in part on the first known abusive computational node, wherein the first graph-based label propagation generates a first risk score for a first candidate computational node;
generate induced subgraph data comprising the first candidate computational node;

determine, for the first candidate computational node, a second risk score that is different from the first risk score;

perform a second graph-based label propagation using the second risk score, wherein the second graph-based label propagation generates a respective first updated risk score for each of the computational nodes of the induced subgraph data; and terminate network access of a first computational node of the induced subgraph data based at least in part on the first updated risk score for the first computational node.

13. The system of claim 12, the at least one non-transitory computer-readable memory storing further instructions that, when executed by the at least one processor, are further effective to program the at least one processor to:

determine a second computational node of the first plurality of computational nodes having a known risk score indicating past abuse; and determine a third risk score for an unlabeled computational node of the first plurality of computational nodes using the first graph-based label propagation based at least in part on the known risk score of the second computational node.

14. The system of claim 13, the at least one non-transitory computer-readable memory storing further instructions that, when executed by the at least one processor, are further effective to program the at least one processor to:

determine, for the second computational node, a third computational node connected to the second computational node in the input graph data and having a fourth risk score above a threshold risk score;

determine, for the third computational node, a fourth computational node connected to the third computational node in the input graph data and having a fifth risk score above the threshold risk score; and generate the induced subgraph data comprising at least the second computational node, the third computational node, and the fourth computational node.

15. The system of claim 12, the at least one non-transitory computer-readable memory storing further instructions that, when executed by the at least one processor, are further effective to program the at least one processor to:

generate second induced subgraph data comprising a second plurality of computational nodes with respective first updated risk scores above a threshold risk score that are connected in a path to one of the at least one known abusive computational nodes;

generate a respective second updated risk score for each of the second plurality of computational nodes of the second induced subgraph data based at least in part on updated ground truth data; and terminate the network access of the first computational node further based at least in part on the respective second updated risk scores for each of the second plurality of computational nodes.

16. The system of claim 12, the at least one non-transitory computer-readable memory storing further instructions that, when executed by the at least one processor, are further effective to program the at least one processor to:

rank the computational nodes of the induced subgraph data in order of ascending values of the first respective updated risk scores;

determine a highest-ranked computational node of the computational nodes of the induced subgraph data; and terminate network access of the highest-ranked computational node.

17. The system of claim 12, the at least one non-transitory computer-readable memory storing further instructions that, when executed by the at least one processor, are further effective to program the at least one processor to:

determine a first set of graph features representing a second computational node of the first plurality of computational nodes, wherein the first set of graph features comprises at least one of degree centrality, Eigenvector centrality, local clustering coefficient, or shortest distance from a known abusive computational node; and generate label data for the second computational node, the label data indicating that the second computational node is an abusive computational node.

18. The system of claim 17, the at least one non-transitory computer-readable memory storing further instructions that, when executed by the at least one processor, are further effective to program the at least one processor to:

train a supervised classifier using the first set of graph features and the label data;

determine a second set of graph features representing a third computational node of the first plurality of computational nodes;

input the second set of graph features into the supervised classifier; and receive first prediction data indicating a prediction of abusiveness for the third computational node.

* * * * *